(12) United States Patent
Beach

(10) Patent No.: US 8,161,676 B1
(45) Date of Patent: Apr. 24, 2012

(54) DEEP THROW CASTING NET

(76) Inventor: Albert Beach, Bluffton, SC (US)

( * ) Notice: Subject to any disclaimer, the term of this patent is extended or adjusted under 35 U.S.C. 154(b) by 1942 days.

(21) Appl. No.: 10/190,945

(22) Filed: Jul. 8, 2002

(51) Int. Cl.
  *A01K 74/00* (2006.01)
  *A01K 75/00* (2006.01)
(52) U.S. Cl. .................................. 43/7; 43/8
(58) Field of Classification Search ............ 43/7, 8, 43/14
  See application file for complete search history.

(56) References Cited

U.S. PATENT DOCUMENTS

| | | | |
|---|---|---|---|
| 371,446 A * | 10/1887 | Gordon | 43/14 |
| 1,762,881 A * | 6/1930 | Nicolayson | 43/7 |
| 2,565,955 A * | 8/1951 | Dobreff | 43/7 |
| 2,723,481 A * | 11/1955 | Schwartz | 43/7 |
| 3,213,560 A * | 10/1965 | Phillips | 43/7 |
| 4,207,700 A | 6/1980 | Marleau | |
| 4,299,047 A | 11/1981 | Collins | |
| 4,697,373 A | 10/1987 | May | |
| 4,790,098 A * | 12/1988 | Lu | 43/7 |
| 5,042,187 A | 8/1991 | Bentzley | |
| 5,361,528 A | 11/1994 | Peacock | |
| 5,497,580 A | 3/1996 | Vanderplaats | |
| 5,979,100 A * | 11/1999 | Lee | 43/8 |
| 6,065,239 A | 5/2000 | Thomas et al. | |
| 6,474,012 B1 * | 11/2002 | Ardern | 43/8 |

* cited by examiner

*Primary Examiner* — Darren W Ark
(74) *Attorney, Agent, or Firm* — John D. Gugliotta, PE, Esq

(57) ABSTRACT

A casting net is provided that allows for easy use. The casting net includes a tail portion and a mouth portion that are connected by a mesh lattice netting. The tail portion is of a smaller diameter than the mouth portion, and the tail portion is substantially closed allowing only a torque line assembly to pass through. The mouth portion is of a substantially larger diameter than the tail portion, so as to provide a larger area for capturing targeted species. A plurality of weights are affixed along the circumference of the mouth portion for providing weight so as to sink the casting net assembly. Along the circumference of the mesh lattice, and in close proximity to the mouth portion, a reinforcing means is affixed so as to provide structural support to the mouth portion and thereby maintaining an open position of the mouth portion as the casting net falls through the water.

10 Claims, 3 Drawing Sheets

DEEP THROW CASTING NET

RELATED APPLICATIONS

The present invention was first described in Disclosure Document Registration 506,152 filed on Feb. 25, 2002 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to a casting net, more particularly, to such a casting net that includes a reinforcing strip to maintain the structural integrity of the casting net as it descends into the sea.

2. Description of the Related Art

Various types of casting net and sea trawling systems have been placed on the market in an attempt to improve the fishing yields generated by both commercial and leisure fishers. Such systems include trawls with suction mechanisms or conveyor arms, netting suspended from attachment arms, and hand held collapsible nets.

Trawling systems that include a suction mechanism are well suited for commercial harvesting of shrimp and small fish. Such systems allow commercial fishing boats to harvest large quantities of fish or shrimp while complying with environmental regulations concerning the harvesting of non-targeted species, such as turtles. However, trawling systems with suction capabilities are more expensive to purchase and maintain than traditional casting nets because of the movable parts. In addition, these trawling systems suction water along with targeted species, which requires the boat to have a reservoir for housing the water as well as the harvested species. This may add to the cost of operation by restricting the amount of the catch and draining fuel because the added water weight creates drag.

Trawling systems with conveyor arms incur some of the same problems as the suction systems. The number of movable parts within a conveyor arm system increases the initial expense of the machine and requires greater maintenance or repair costs. In addition, the added weight of this machinery to a boat will likely increase the drag on the boat, and thus, increase the fuel consumption to propel the boat through the water.

Netting systems suspended from supporting arms allows for towing the net to the fishing boat, easing the physical workload of the fishers. However, such systems also require that expensive, and perhaps unnecessary, modifications be performed on the fishing vessel so as to support a net weighted down with targeted species and other bycatch.

Collapsible nets are the simplest and least expensive systems in use. However, the collapsible nets disclosed by the prior art are directed for use by leisure or sporting fishers or are of such bulk as to require the use of a helicopter for collection, as described in U.S. Pat. No. 6,065,239.

The present invention is aimed at an improved casting net by offering a relatively inexpensive system for deep sea fishing. The present invention is a hand-tossed casting net so that no motorized trawling system nor attachment arms are required to tow the net. The present invention is additionally reinforced with a sufficiently rigid stripping that maintains the structure of the net as the net descends deeper into the water, and thereby allows fishing at greater depths than presently available casting nets. Many types of aquatic life live closer to the sea floor, thus the present invention allows the user to tap into an abundant supply of target species.

A search of the prior art did not disclose any patents that read directly on the claims of the instant invention; however, the following references were considered related.

U.S. Pat. No. 6,065,239 issued in the name of Thomas et al., describes an automatically-closing drop fishing net.

U.S. Pat. No. 5,497,580 issued in the name of Vanderplaats, describes a collapsible fishing net apparatus.

U.S. Pat. No. 5,361,528 issued in the name of Peacock, describes a trawling system and trawl device for shrimp.

U.S. Pat. No. 5,042,187 issued in the name of Bentzley, describes a brine shrimp harvester consisting of a conveyor belt fitted with a plurality of net-fitted frames.

U.S. Pat. No. 4,697,373 issued in the name of May, describes a shrimping net with vibratory bottom roller.

U.S. Pat. No. 4,299,047 issued in the name of Collins, describes a collapsible, wheel-supported shrimp trawl.

U.S. Pat. No. 4,207,700 issued in the name of Marleau, describes a collapsible fishing net apparatus.

Consequently, there exists a continuous need for new product ideas and enhancements for existing products in the casting net industry.

SUMMARY OF THE INVENTION

It is therefore an object of the present invention to provide an improved casting net apparatus.

It is a feature of the present invention to provide an improved casting net apparatus that combines inexpensive and long-lasting components completely integrated to provide a convenient means for harvesting targeted species.

It is a further feature of the present invention to provide an improved casting net apparatus that includes a reinforcing strip that maintains the structural integrity of the net as it descends deeper into the water and provides the opportunity for a larger fishing harvest.

Briefly described according to one embodiment of the present invention, a casting net is provided that allows for easy use. The casting net includes a tail portion and a mouth portion that are connected by a mesh lattice netting. The tail portion is of a smaller diameter than the mouth portion, and the tail portion is substantially closed allowing only a torque line assembly to pass through. The mouth portion is of a substantially larger diameter than the tail portion, so as to provide a larger area for capturing targeted species. A plurality of weights are affixed along the circumference of the mouth portion for providing weight so as to sink the casting net assembly. Along the circumference of the mesh lattice, and in close proximity to the mouth portion, a reinforcing means is affixed so as to provide structural support to the mouth portion and thereby maintaining an open position of the mouth portion as the casting net falls through the water.

The use of the present invention provides users with all of the materials and tools necessary to ensure that when operating in a fishing-related industry or sport, a user will be able to easily operate and maintain the casting net.

An advantage of the present invention is that it is specifically adapted for personal use because of the light weight components and the use of inexpensive materials.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
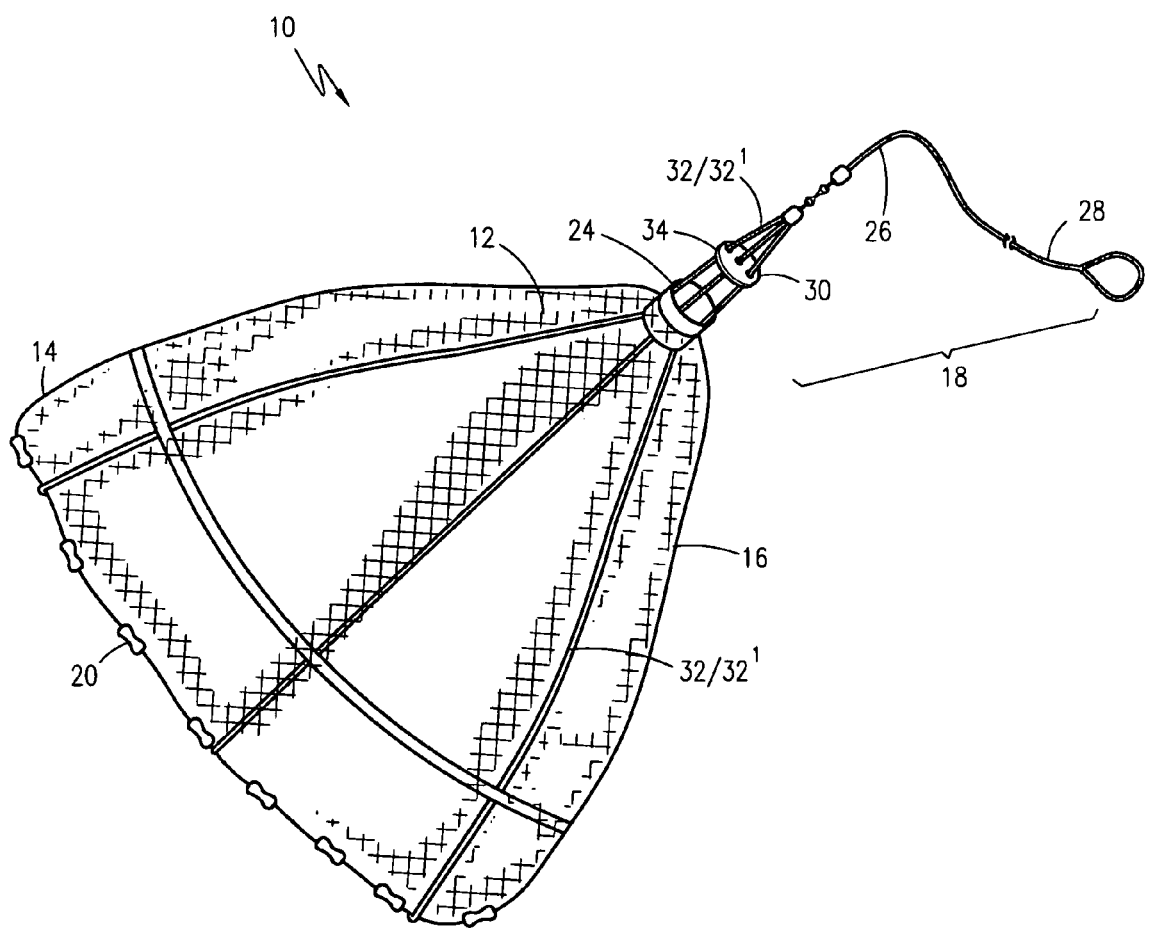
FIG. 1 is a perspective view of a casting net.

Referring now to FIG. 1, a casting net 10 is shown, according to the present invention, and includes a substantially enclosed tail portion 12, a mesh lattice 16 longitudinally radiating from the tail portion 12 to a mouth portion 14, in which the mouth portion is opposite to the tail portion 12. A torque line assembly 18 passes through the tail portion 12 and extends to the mouth portion 14. A plurality of weights 20 are affixed to the outer circumference of the mouth portion 14. A reinforcement means 22 is positioned near the mouth portion 14 and approximately follows the curvilinear circumference of the mouth portion 14.

The tail portion 12 includes an annular sleeve 24 which serves as an attachment point for the mesh lattice 16 and a means for allowing the individual torque line strands 32 and 32' to smoothly pass through the tail portion 12 as the casting net 10 is towed or gathered. The annular sleeve 24 is preferably manufactured from a durable material that is resistant to water-induced corrosion, such as plastic or treated metal.

The torque line assembly 18 includes a linearly elongated single torque line 26, including a loop 28, adjoined to a plurality of linearly elongated torque line strands 32 and 32' at a line coupler 30. The torque line strands 32 and 32' pass through a line shield 34 and are attached to the circumference of the mouth portion 14. The torque line assembly 18 provides a user with the convenience and ease of tugging or pulling on a single torque line 26 for towing or gathering the casting net 10. The line shield 34 prevents the line coupler 30 from completely passing through the annular sleeve 24 and to prevent damage to the torque line assembly 18.

Figure 2:
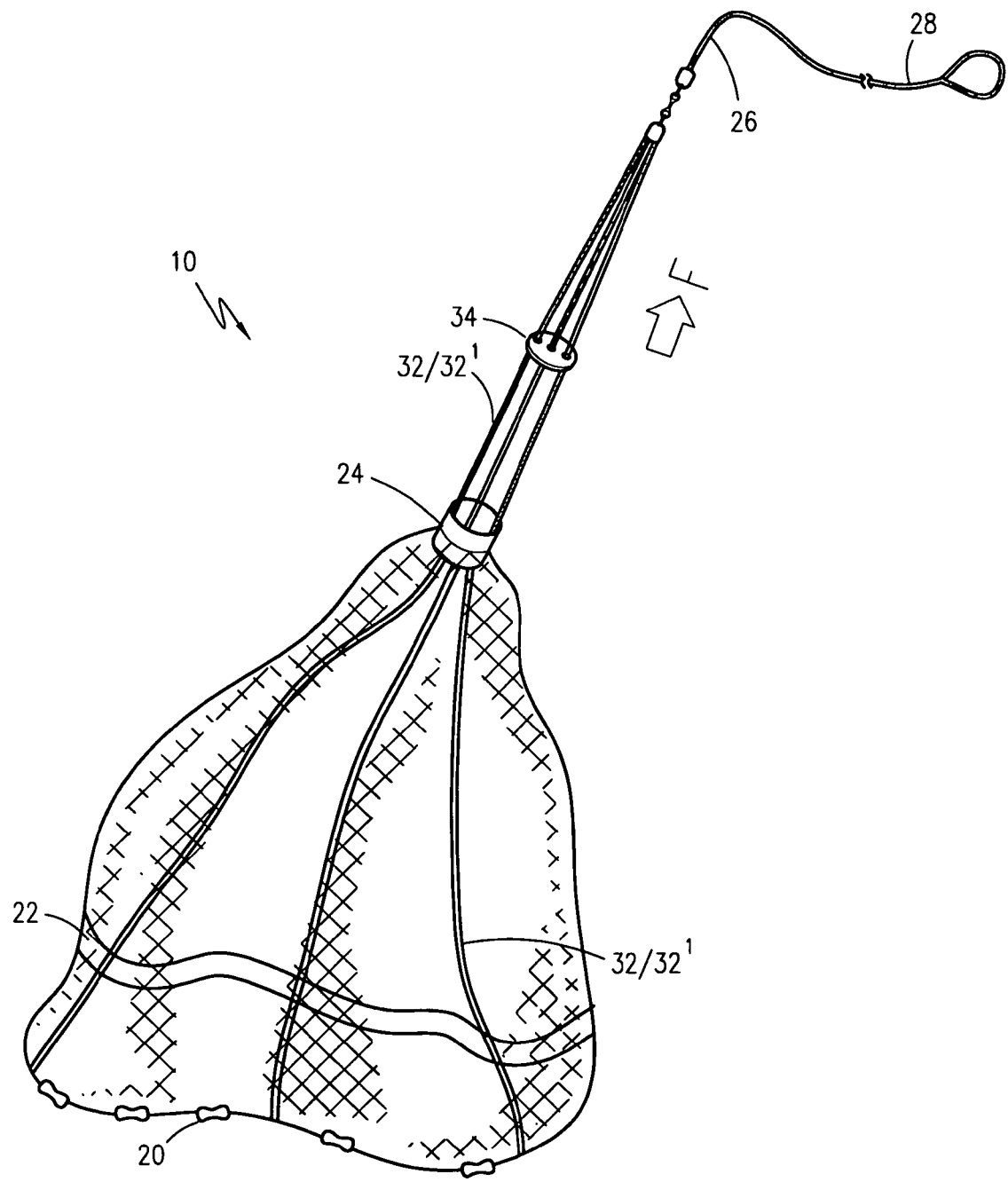
FIG. 2 is a perspective view of the casting net in a closed arrangement, wherein the torque line is pulled along the line F and results in the mouth portion closing to trap the harvested species.
Figure 3:
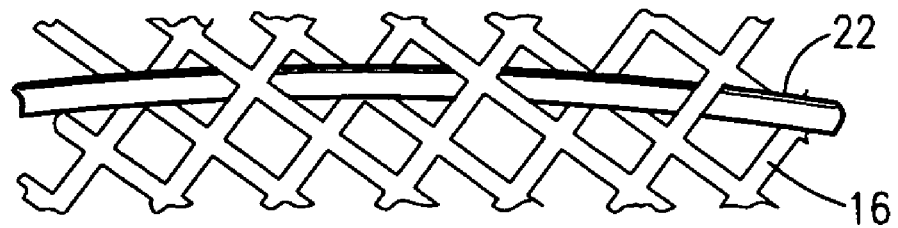
FIG. 3 is a perspective view of an alternative embodiment of the reinforcing strip attached to the mesh lattice.
Figure 4:
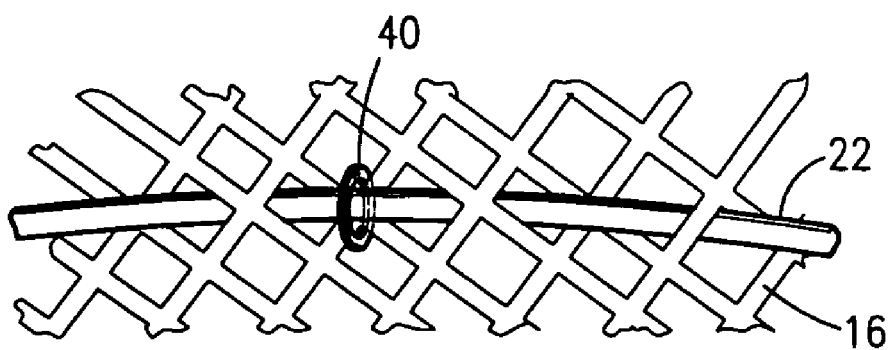
FIG. 4 is a perspective view of another alternative embodiment of the reinforcing strip attached to the mesh lattice.

The mesh lattice 16 includes a tapered tail portion 12 and attaches to the annular sleeve 24, while also including an expandable mouth portion 14. At full expansion, the mesh lattice 16 generally has a dome shape and allows targeted species to enter through the mouth portion 14. The mesh lattice 16 is sufficiently small so as to prevent escape of the captured sea species. Preferably, the mesh lattice 16 is manufactured from a durable material that is also flexible so as to stretch when, for example, the torque line assembly 18 closes the mouth portion 14 (as shown in FIG. 2, moving along the line of force F). The material used for manufacturing the mesh lattice 16 may include nylon or another suitable material.

A plurality of weights 20 are affixed to the circumference of the mouth portion 14 to provide a means for sinking the casting net 10 to the lower depths of the sea floor. Preferably, the weights 20 are manufactured from a durable material that is resistant to water-induced corrosion, such as plastic or treated metal. Each individual weight 20 will have a specific gravity greater than water to provide the sinking action.

Referring now to FIG. 1 through FIG. 4, the reinforcement means 22 is positioned along the circumference of the mesh lattice 16 approximately one inch to four inches near the mouth portion 14. In one embodiment (shown in FIG. 2), the reinforcement means 22 is heat molded to the mesh lattice 16. In an alternative embodiment (shown in FIG. 3), the reinforcement means 22 is interwoven into the mesh lattice 16 structure. In another alternative embodiment (shown in FIG. 4), the reinforcement means 22 may be fixedly attached to the inner or outer surface of the mesh lattice 16 by way of a fastener 40. The reinforcement means 22 approximately follows the curvilinear circumference of the mouth portion 14. Preferably, the reinforcement means 22 is manufactured from a durable material that is resistant to water-induced corrosion, such as a light plastic or treated metal. Preferably, the reinforcement means 22 is manufactured from a flexible material so as to allow the mesh lattice 16 to collapse inwardly and substantially close when the torque line assembly 18 is manipulated for towing the casting net 10 back toward the user, thereby preventing the captured species from escaping the mesh lattice 16 through an opened mouth portion 14. A flexible material suitable for acting as a reinforcement means may include pliable plastic, pliable metal, or expandable rubber, among other materials known in the art.

2. Operation of the Preferred Embodiment

A user will secure the torque line loop 28 to an object so as to prevent the torque line 26 from following the casting net 10 into the water. A user will then grasp the casting net 10 along the mouth portion 14 with both hands spaced apart. The user will twist away from the water, and then twist toward the water so as to generate momentum for throwing the casting net 10 into the water. Preferably, as the user releases the mouth portion 14, the user will generate a clockwise or counterclockwise rotation so the mouth portion 14 will rotate in such a motion in a plane just above and parallel to the surface of the water. Generating a clockwise or counterclockwise motion allows the mouth portion 14 to expand to an optimum diameter before falling into the water.

The plurality of weights 20 (of a specific gravity greater than water) will force the casting net 10 to fall through the water until the casting net 10 reaches the sea floor (if such a depth is desired). The reinforcing means 22 provides structural stability to the mouth portion 14 as the casting net 10 falls through the water, thereby preventing the mouth portion 14 from folding or collapsing inward.

When the user is ready to harvest the catch, the user will pull on the torque line 26 in a direction away from the water, which will cause the line coupler 30 and torque line strands 32 and 32' to follow the torque line 26 in the same direction (shown in FIG. 2 as line of force F). The torque line strands 32 and 32' will act to gather the mouth portion 14 so as to close the mouth portion 14 and prevent the catch from escaping as the casting net 10 is towed by the user. The user then continues to pull on the torque line 26 until the casting net 10 is within the grasp of the user. The mesh lattice 16 allows the water to escape the casting net 10 but prevents the catch from escaping. Once the casting net 10 is in place, the mouth portion 14 is opened for releasing the catch into the appropriate storage area.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A casting net comprising:
   a substantially enclosed tail portion;
   a mesh lattice longitudinally radiating from said tail portion to a mouth portion, in which said mouth portion is opposite to said tail portion;
   reinforcement means attached to said mesh lattice and positioned along a circumference of said mesh lattice approximately one inch to four inches from said mouth portion to prevent undesired inward collapse of said mouth portion;
   a plurality of weights affixed at said mouth portion; and
   a torque line assembly passing through said tail portion and extending to said mouth portion.

2. The casting net of claim 1, wherein said tail portion comprises an annular sleeve for serving as an attachment point for said mesh lattice and a means for allowing individual torque line strands of said torque line assembly to smoothly pass through said tail portion.

3. The casting net of claim 1, wherein said torque line assembly comprises a single linearly elongated torque line and a loop adjoined at a coupler to a plurality of linearly elongated torque line strands;
   wherein said torque line strands pass through a line shield and are affixed to a circumference of said mouth portion.

4. The casting net of claim 3, wherein said line shield is a disc having a plurality of apertures for said torque line strands to pass and which prevents damage to said torque line assembly by preventing the torque line assembly from passing through an annular sleeve of said tail portion.

5. The casting net of claim 1, wherein said mesh lattice comprises a dome-shape having said tail portion which is tapered and attached to an annular sleeve of said tail portion and said mouth portion which is expanded and opposite to said tapered tail portion.

6. The casting net of claim 1, wherein said plurality of weights are affixed to a circumference of said mouth portion for providing means for sinking said casting net to lower sea depths;
   wherein said plurality of weights have a specific gravity greater than water to provide said sinking and are manufactured from a durable and non-corrosive material.

7. The casting net of claim 1, wherein said reinforcement means further comprises a flexible material for maintaining said mouth portion in an expanded orientation for harvesting fish and for collapsing inwardly when said torque line assembly is manipulated for towing.

8. The casting net of claim 7, wherein said reinforcement means is manufactured from a group chosen from plastic, metal or expandable rubber.

9. The casting net of claim 1, wherein said reinforcement means is attached to said mesh lattice by heat molding.

10. The casting net of claim 1, wherein said reinforcement means is attached to said mesh lattice by interweaving said reinforcement means through the mesh lattice openings in a back and forth manner.

\* \* \* \* \*

(12) EX PARTE REEXAMINATION CERTIFICATE (9966th)
United States Patent
Beach

(10) Number: US 8,161,676 C1
(45) Certificate Issued: Dec. 2, 2013

(54) DEEP THROW CASTING NET

(76) Inventor: Albert Beach, Bluffton, SC (US)

Reexamination Request:
No. 90/020,051, Apr. 12, 2013

Reexamination Certificate for:
Patent No.: 8,161,676
Issued: Apr. 24, 2012
Appl. No.: 10/190,945
Filed: Jul. 8, 2002

(51) Int. Cl.
*A01K 74/00* (2006.01)
*A01K 75/00* (2006.01)

(52) U.S. Cl.
USPC .................................................. 43/7; 43/8

(58) Field of Classification Search
None
See application file for complete search history.

(56) References Cited

To view the complete listing of prior art documents cited during the proceeding for Reexamination Control Number 90/020,051, please refer to the USPTO's public Patent Application Information Retrieval (PAIR) system under the Display References tab.

*Primary Examiner* — Jeffrey L. Gellner

(57) ABSTRACT

A casting net is provided that allows for easy use. The casting net includes a tail portion and a mouth portion that are connected by a mesh lattice netting. The tail portion is of a smaller diameter than the mouth portion, and the tail portion is substantially closed allowing only a torque line assembly to pass through. The mouth portion is of a substantially larger diameter than the tail portion, so as to provide a larger area for capturing targeted species. A plurality of weights are affixed along the circumference of the mouth portion for providing weight so as to sink the casting net assembly. Along the circumference of the mesh lattice, and in close proximity to the mouth portion, a reinforcing means is affixed so as to provide structural support to the mouth portion and thereby maintaining an open position of the mouth portion as the casting net falls through the water.

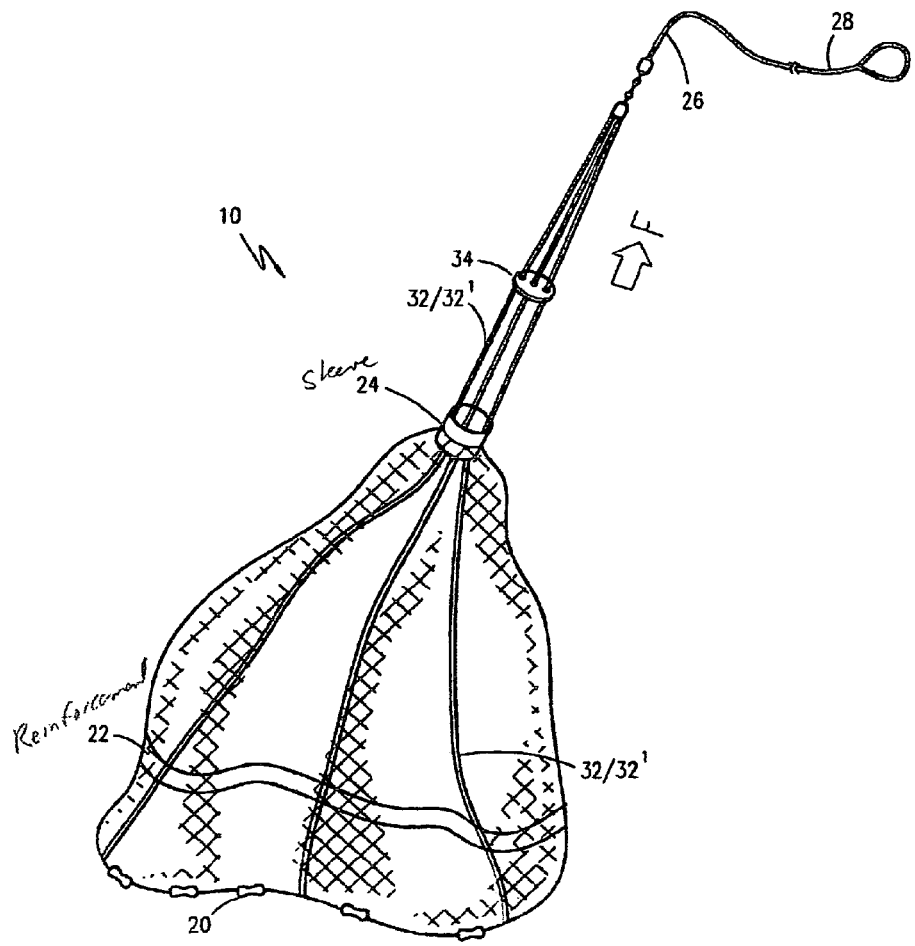

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *